(12) United States Patent
Huettner et al.

(10) Patent No.: US 8,614,882 B2
(45) Date of Patent: Dec. 24, 2013

(54) CARD CONNECTOR WITH A SERVOMECHANICAL DEVICE FOR REPOSITIONING AN EXPANSION CARD

(75) Inventors: Cary M. Huettner, Rochester, MN (US); Joseph Kuczynski, Rochester, MN (US); Robert E. Meyer, III, Rochester, MN (US); Mark D. Plucinski, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 13/164,886

(22) Filed: Jun. 21, 2011

(65) Prior Publication Data

US 2012/0327612 A1 Dec. 27, 2012

(51) Int. Cl.
*H05K 7/00* (2006.01)
*H05K 5/00* (2006.01)
(52) U.S. Cl.
USPC ............ 361/679.01; 361/763; 361/679.32
(58) Field of Classification Search
USPC ............ 361/763, 679.32, 679.01; 242/480.9
See application file for complete search history.

(56) References Cited

U.S. PATENT DOCUMENTS

| | | | |
|---|---|---|---|
| 4,740,164 A | 4/1988 | Schulz et al. | |
| 5,138,868 A * | 8/1992 | Long | 73/1.79 |
| 6,099,362 A * | 8/2000 | Viches et al. | 439/817 |
| 6,345,988 B1 * | 2/2002 | Ketcham | 439/74 |
| 6,371,781 B1 * | 4/2002 | Jones et al. | 439/260 |
| 6,669,493 B2 | 12/2003 | Kuroda | |
| 6,762,615 B2 * | 7/2004 | Lee et al. | 324/756.05 |
| 6,824,410 B1 * | 11/2004 | Co et al. | 439/260 |
| 6,843,663 B2 | 1/2005 | Lee | |
| 6,981,886 B1 | 1/2006 | Co et al. | |
| 7,210,950 B2 | 5/2007 | Tanaka et | |
| 7,686,652 B2 | 3/2010 | Yu et al. | |
| 7,746,665 B2 | 6/2010 | Junkins et al. | |
| 8,035,408 B1 * | 10/2011 | Co | 324/756.02 |
| 2003/0130760 A1 * | 7/2003 | Abraham et al. | 700/213 |
| 2009/0017687 A1 * | 1/2009 | Harris et al. | 439/630 |
| 2010/0213027 A1 * | 8/2010 | Co et al. | 198/346.1 |

* cited by examiner

*Primary Examiner* — Adrian S Wilson
*Assistant Examiner* — Abhishek Rathod
(74) *Attorney, Agent, or Firm* — Isaac J. Gooshaw; Abdul-Samad A. Adediran

(57) ABSTRACT

A card connector having a housing with a receiving slot and connector pins are provided. An expansion card having docking well regions, contact pads, and backup contact pads is inserted in the receiving slot. The connector pins are connected to the docking well regions on the expansion card. The expansion card is coupled to a servomechanical device that can slide the expansion card to connect the connector pins with the contact pads. Connector pins and contact pads are coated with an interface material that is subject to wearing. Worn interface material can cause weak electrical connections between connector pins and contact pads. Thus, a card connector with a servomechanical device is provided to slide an expansion card within a receiving slot of the card connector for an improved electrical connection between connector pins and contact pads.

13 Claims, 7 Drawing Sheets

CARD CONNECTOR WITH A SERVOMECHANICAL DEVICE FOR REPOSITIONING AN EXPANSION CARD

TECHNICAL FIELD

The present invention relates to a card connector with a servomechanical device for repositioning an expansion card that is inserted in a receiving slot of the card connector.

BACKGROUND

Expansion cards are widely used throughout the computer industry, including computers such as high-end and mid-range servers. An expansion card can be inserted in a card connector on a motherboard to provide additional computer functionality. Specifically, an expansion card has contact pads, and a card connector has a receiving slot with connector pins disposed adjacent to sidewalls of the receiving slot. Thus, connector pins can connect to contact pads after an expansion card is inserted in the receiving slot.

Furthermore, computers are often packaged and shipped to customer locations after expansion cards are inserted in receiving slots of card connectors. However, computers with expansion cards inserted in receiving slots are frequently subjected to shocks and vibrations during shipment of the computers and computer components. For example, computers can be subjected to shocks and vibrations while handlers are loading the computers on or off a vehicle, or are transporting the computers in a vehicle over a rough terrain. The shocks and vibrations can cause wearing and damage to interface material that is on connector pins and contact pads. Connector pins and contact pads are copper, and both connector pins and contact pads are coated with interface material that can include, but is not limited to, gold and nickel. Thus, the aggregate shock and vibrations during shipment can cause the gold and even the nickel interface material to completely wear away, leaving the copper of the connector pins and the copper of the contact pads exposed and in direct contact with each other. The wearing away of interface material can be detrimental to the reliability of an electrical connection between connector pins and contact pads. Specifically, the wearing away of interface material can lead to a weak electrical connection between connector pins and contact pads, which can cause an expansion card to operate incorrectly or completely fail because of the weak electrical connection. The challenge of providing a card connector and an expansion card that mitigates the wearing away of the interface material and provides a reliable electrical connection between connector pins and contact pads continues to persist.

SUMMARY

Presented herein is a card connector having a housing that includes a receiving slot, wherein connector pins are adjacent to sidewalls of the receiving slot. An expansion card is inserted in the receiving slot and is coupled to a servomechanical device. The servomechanical device can be utilized to slide the expansion card parallel to sidewalls of the receiving slot. The expansion card includes contact pads, backup contact pads, and docking well regions. The connector pins, contact pads, and backup contact pads are coated with interface material that can include, but is not limited to, gold and nickel. Interface material on connector pins and contact pads is subject to wearing, caused by shocks and vibrations, if the connector pins are directly connected to contact pads during shipment. Accordingly, the docking well regions are where connector pins can reside during shipment of computers and computer components, to minimize wearing of interface material. After shipment, the servomechanical device can slide the expansion card based on a set of triggering events such that the connector pins connect to contact pads or backup contact pads on the expansion card. An expansion card with docking well regions, contact pads, backup contact pads, and a servomechanical device coupled to the expansion card can mitigate wearing of interface material, and provide an improved electrical connection between connector pins and the expansion card.

A first aspect of the embodiments provides an apparatus that includes a card connector having a housing with a receiving slot. One or more connector pins are disposed in the receiving slot. An expansion card having a docking well region, a contact pad, and a backup contact pad, wherein the expansion card is coupled to the card connector. A servomechanical device is coupled to the expansion card, wherein the servomechanical device is utilized to move the expansion card in the receiving slot.

A second aspect of the embodiments provides an expansion card with a docking well region formed on the expansion card. A contact pad is formed on the expansion card. A backup contact pad is formed on the expansion card.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

Figure 1:
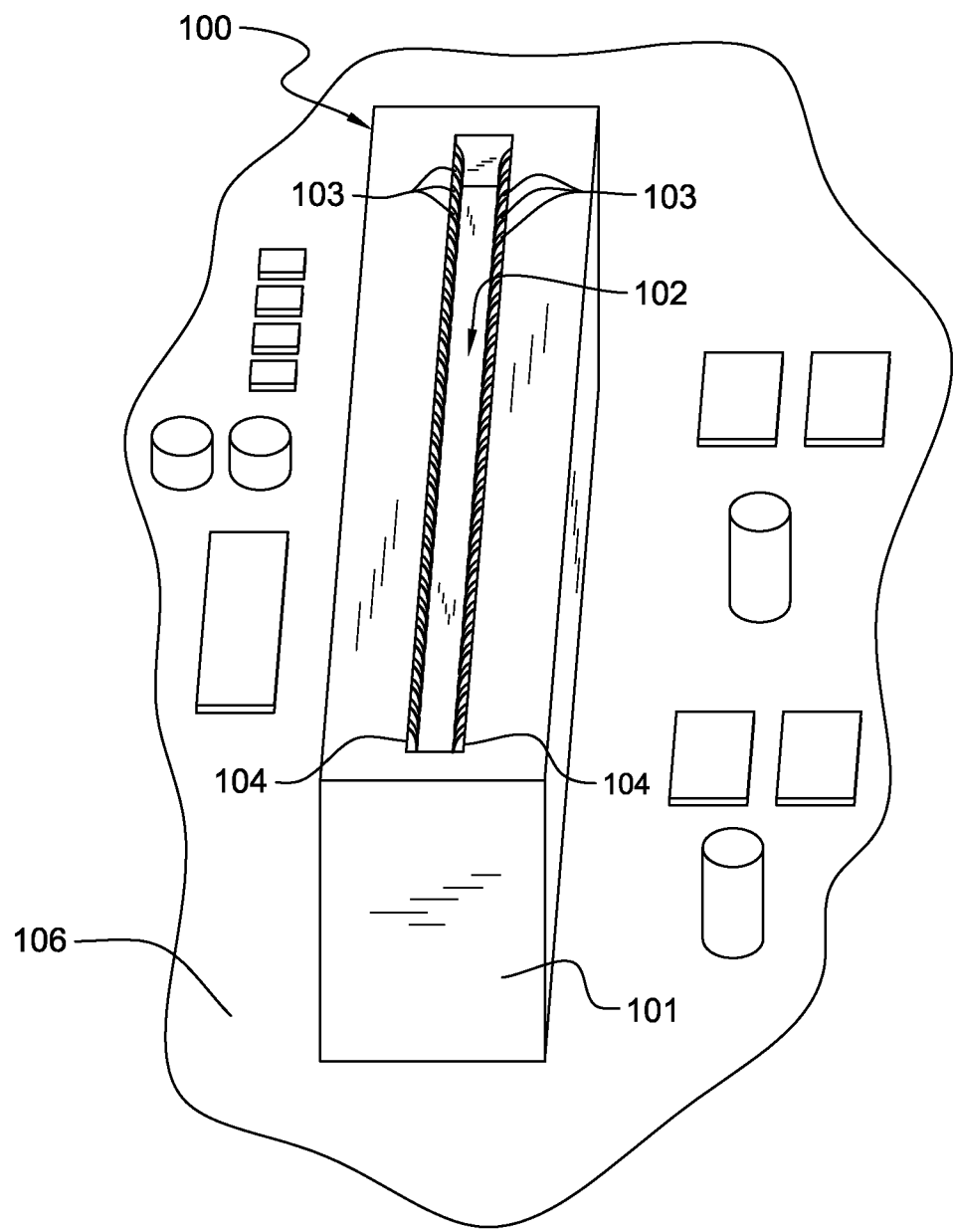
FIG. 1 is a perspective view of a card connector having a housing that includes a receiving slot, wherein connector pins are adjacent to sidewalls of the receiving slot and the card connector is coupled to a motherboard according to one embodiment of the present invention.

The drawings are not necessarily to scale. The drawings, some of which are merely pictorial and schematic representations, are not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

References in the specification to "one embodiment", "an embodiment", "an example embodiment", "an alternative embodiment", "another embodiment", etc., indicate that the embodiment described may include a particular feature, element, structure, or characteristic, but every embodiment may not necessarily include the particular feature, element, structure, or characteristic. Moreover, such phrases are not necessarily referring to the same embodiment.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In addition, it will be understood that when an element is referred to as being "on", "over", "disposed on", "disposed over", "deposited on", or "deposited over" another element, it can be directly on the other element or intervening elements may also be present. In contrast, when an element is referred to as being "directly on", "directly over", or "disposed proximately to" another element, there are no intervening elements present. Furthermore, it will be understood that when an element is referred to as being "adjacent to" or "disposed adjacent to" another element, it can be directly adjacent to the other element or intervening elements may be present. In contrast, when an element is referred to as being "directly adjacent to" another element, there are no intervening elements present. Moreover, it will be understood that when an element is referred to as being "on and adjacent to" or "disposed on and adjacent to" another element, it can be directly on and adjacent to the other element or intervening elements may be present. In contrast, when an element is referred to as being "directly on and adjacent to" another element, there are no intervening elements present. Lastly, it will also be understood that when an element is referred to as being "connected" or "coupled" to another element, it can be directly connected or directly coupled to the other element, or intervening elements may be present. In contrast, when an element is referred to as being "directly connected" or "directly coupled" to another element, there are no intervening elements present.

Embodiments of the present invention provide a card connector having a housing that includes a receiving slot, connector pins adjacent to sidewalls of the receiving slot, and a servomechanical device for repositioning an expansion card that is inserted in the receiving slot. Thus, an expansion card can be inserted in the receiving slot, and the expansion card can be moved such that connector pins connect to contact pads that are formed on the expansion card. Connector pins and contact pads are coated with an interface material that can include, but is not limited to, gold and nickel. The interface material is subject to wearing during computer shipment, and worn interface material can cause a poor electrical connection between a connector pin and a contact pad on an expansion card. However, a servomechanical device can be utilized to reposition an expansion card, so that connector pins join to contact pads or backup contact pads for an improved electrical connection.

FIG. 1 illustrates a perspective view of a card connector 100 having a housing 101, wherein the housing is connected to motherboard 106. Card connector 100 has receiving slot 102 with sidewalls 104 and 105 (shown in FIG. 6). Connector pins 103 are adjacent to sidewalls 105 of receiving slot 102. Electrical power is supplied to card connector 100 through motherboard 106. In addition, connector pins 103 are electrically isolated from each other to prevent unintended short circuiting.

Figure 2:
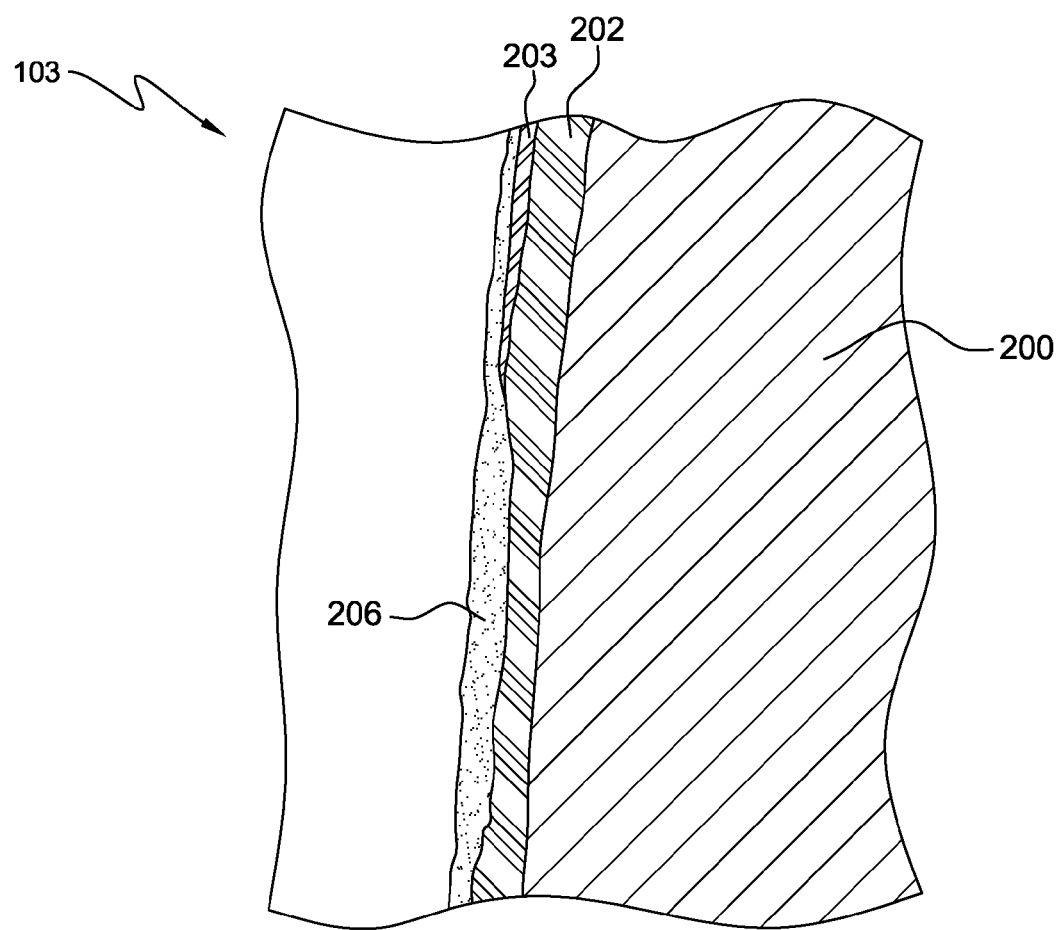
FIG. 2 is a magnified view of a connector pin, wherein interface material on the connector pin is worn away according to one embodiment of the present invention.

FIG. 2 illustrates a magnified view of a connector pin 103 (also shown in FIG. 3), wherein interface material 304 (shown in FIG. 3) formed on the connector pin is worn away. Specifically, connector pin 103 includes copper base region 200, nickel layer 202 adjacent to the copper base region, and gold layer 203 adjacent to the nickel layer. Connector pin region 206 illustrates where interface material 304, which includes gold layer 203 and nickel layer 202, is worn away caused by shocks and vibrations during computer shipment.

Figure 3:
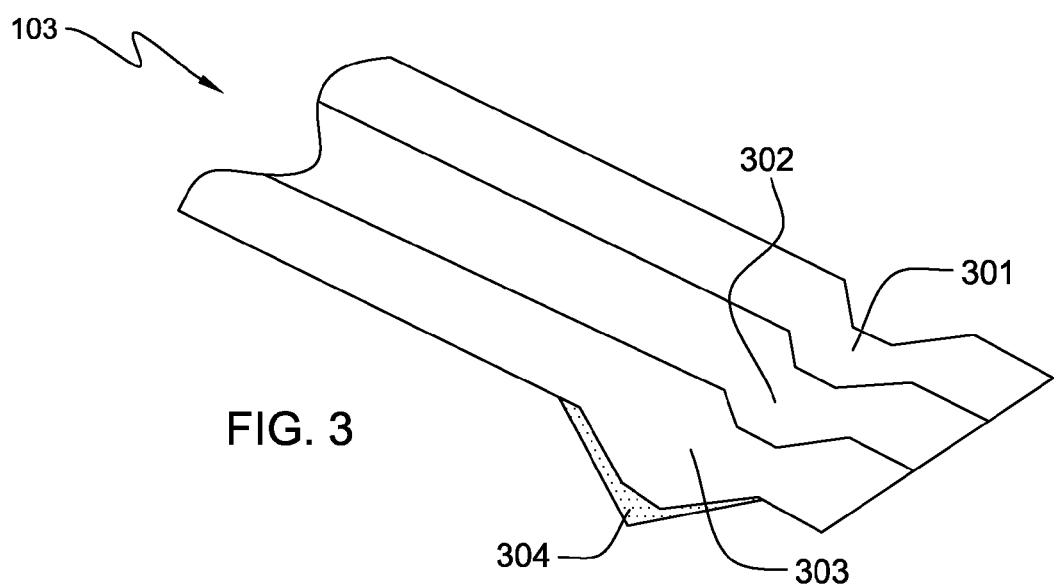
FIG. 3 is a perspective view of a connector pin having connector contact regions according to one embodiment of the present invention.

FIG. 3 illustrates a perspective view of a connector pin 103, wherein the connector pin has three contact regions 301-303, and wherein interface material 304 is formed on the contact regions. By utilizing servomechanical device 500 (shown in FIG. 5), contact region 301 can make a connection with contact pad 406 (shown in FIG. 4) or backup contact pad 409 (shown in FIG. 4), contact region 302 can make a connection with backup contact pad 407 or 410 (shown in FIG. 4), and contact region 303 can make a connection with backup contact pad 408 or 411 (shown in FIG. 4). In the present embodiment, connector pin 103 has three contact regions 301-303. However, in other in embodiments connector pin 103 may have one contact region, two contact regions, or more than three contact regions depending on the configuration of contact pads 406 and backup contact pads 407-411 that are formed on expansion card 400 (shown in FIG. 4).

Figure 4:
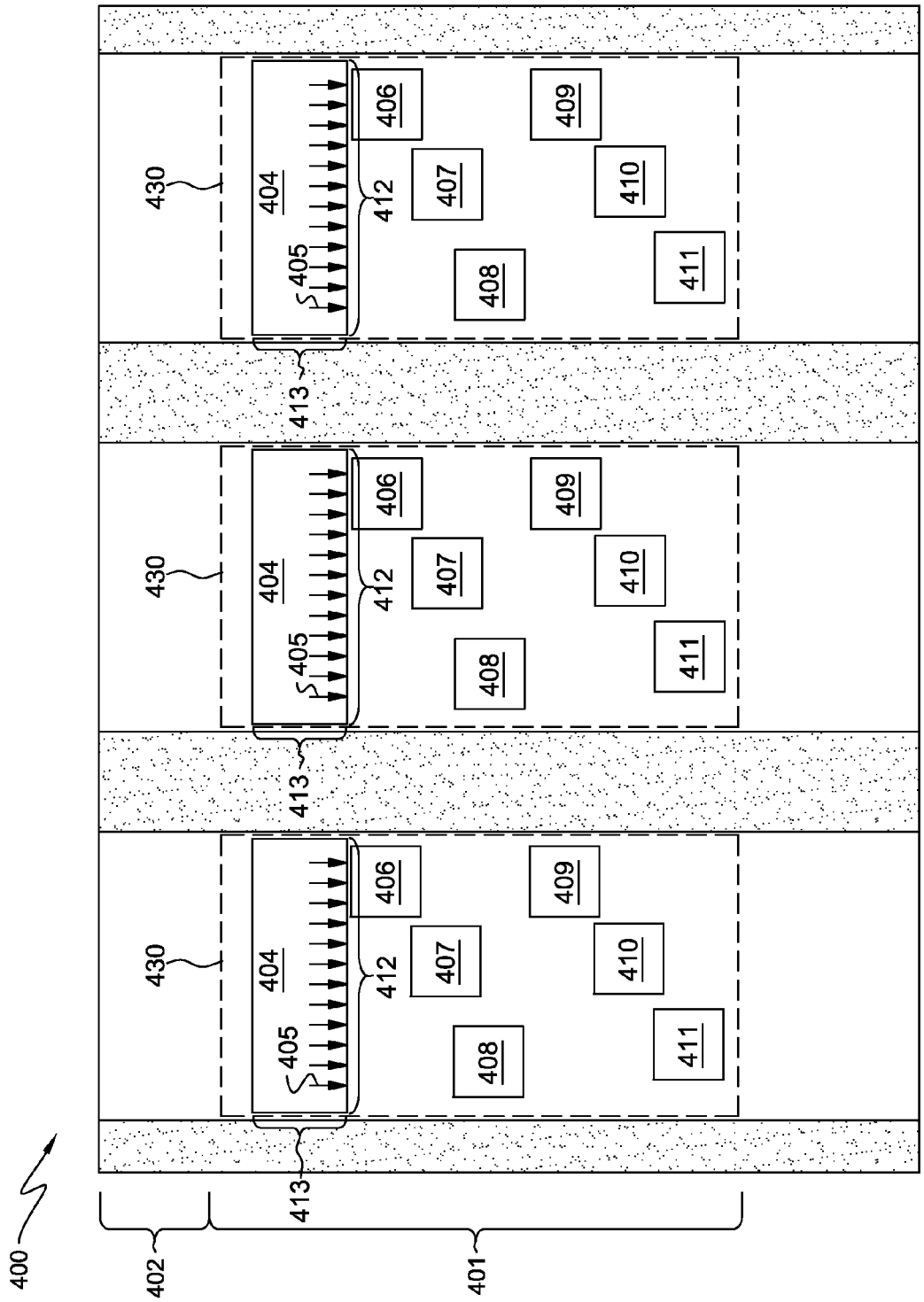
FIG. 4 is a magnified top planar view of an expansion card with a front-end surface and back-end surface, wherein docking well regions, contact pads, and backup contact pads are formed on the front-end surface of the expansion card according to one embodiment of the present invention.

FIG. 4 illustrates a magnified top planar view of an expansion card 400 with a front-end surface 401 and a back-end surface 402, wherein the expansion card has one or more card regions 430. Card regions 430 include contact areas, wherein the contact areas include docking well regions 404, contact pads 406, and backup contact pads 407-411 formed on the front-end surface. Docking well regions 404 are depressions that are formed on front-end surface 401, wherein the docking well regions have a well-length 412 and a well-width 413. Well-length 412 and well-width 413 form an area large enough for contact regions 301-303 (shown in FIG. 3) of connector pin 103 (shown in FIG. 3) to completely reside in one of docking well regions 404. A nickel bather layer can be deposited on docking well regions 404, wherein the nickel barrier layer can mitigate wearing away of interface material 304 (shown in FIG. 3) on connector pin 103 during the shipment of computers and computer components. In addition, docking well regions 404 have a trailing edge 405 that is sloped to facilitate sliding of expansion card 400, which allows connector pin 103 to connect to one of contact pads 406 with minimal wearing of interface material 304.

Moreover, contact pads 406 and backup contact pads 407-411 are asperities formed on front-end surface 401 of expansion card 400. Specifically, contact pads 406 and backup contact pads 407-411 are copper coated with an interface material 304 that can include, but is not limited to, gold and nickel. Contact pads 406 are adjacent to trailing edge 405 of docking well regions 404. Backup contact pads 407-411 are spaced at a distance from each other on expansion card 400 such that connector pins 103 can stay in contact with at least one of the backup contact pads, even while servomechanical device 500 (shown in FIG. 5) slides the expansion card. For example, servomechanical device 500 can slide expansion card 400 from a first position to a second position, wherein connector pins 103 can connect to subsequent backup contact pads 407 before the connector pins are completely driven free from the first position on contact pads 406. Thus, servomechanical device 500 can include a ratchet and a screw mechanism, and the application of electrical power to the servomechanical device can engage the ratchet and the screw mechanism to slide expansion card 400 in a desired direction.

Figure 5:
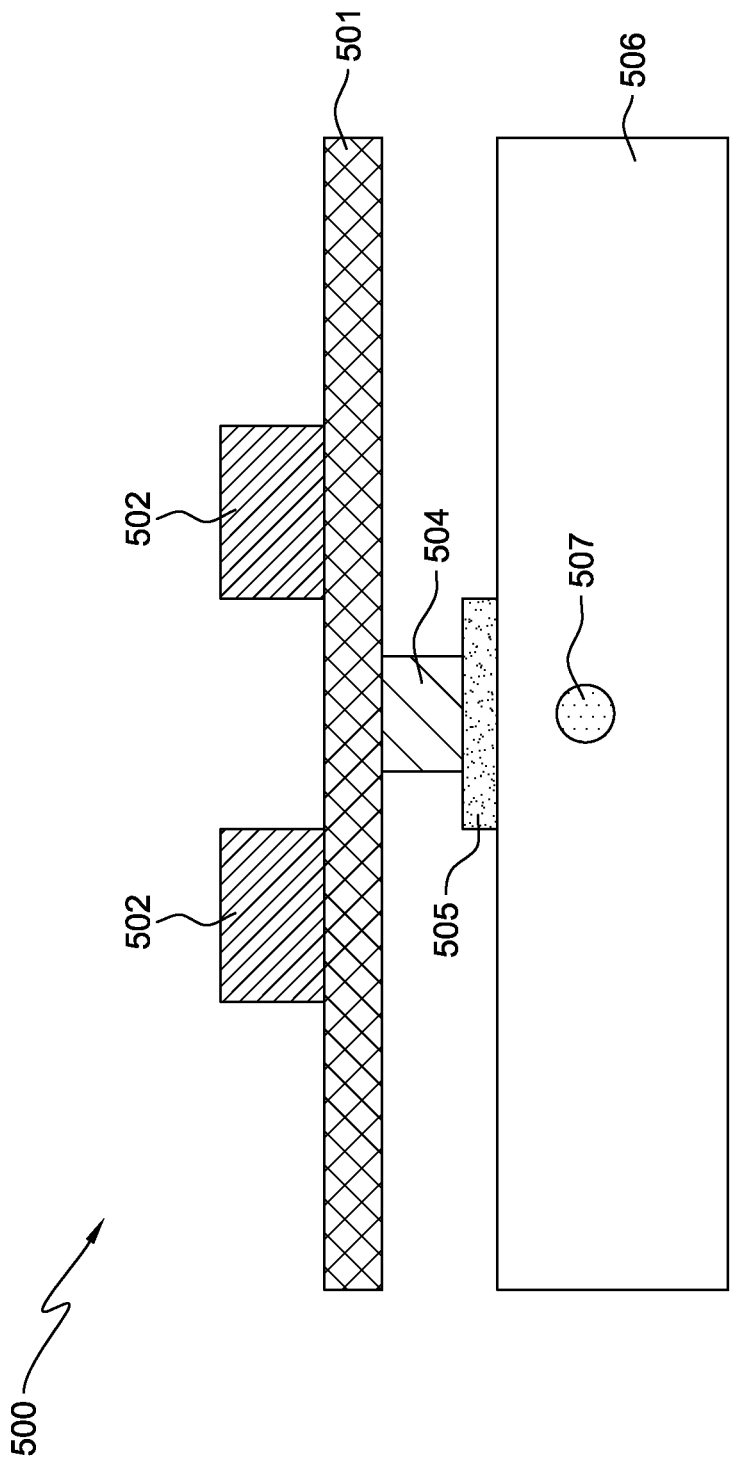
FIG. 5 is a side view of a servomechanical device according to one embodiment of the present invention.

FIG. 5 illustrates a side view of servomechanical device 500 having support plate 501, plate latches 502, screw mechanism 504, internally threaded cylindrical housing 505, body 506, and ratcheting-arm 507. Screw mechanism 504 is connected to support plate 501. Support plate 501 includes plate latches 502 for securing a structure to the support plate. Moreover, inside body 506, ratcheting-arm 507 is coupled to screw mechanism 504 and cylindrical housing 505. Ratcheting-arm 507 can be utilized to turn housing 505 in order to raise or lower support plate 501 and a structure held by plate latches 502.

Figure 6:
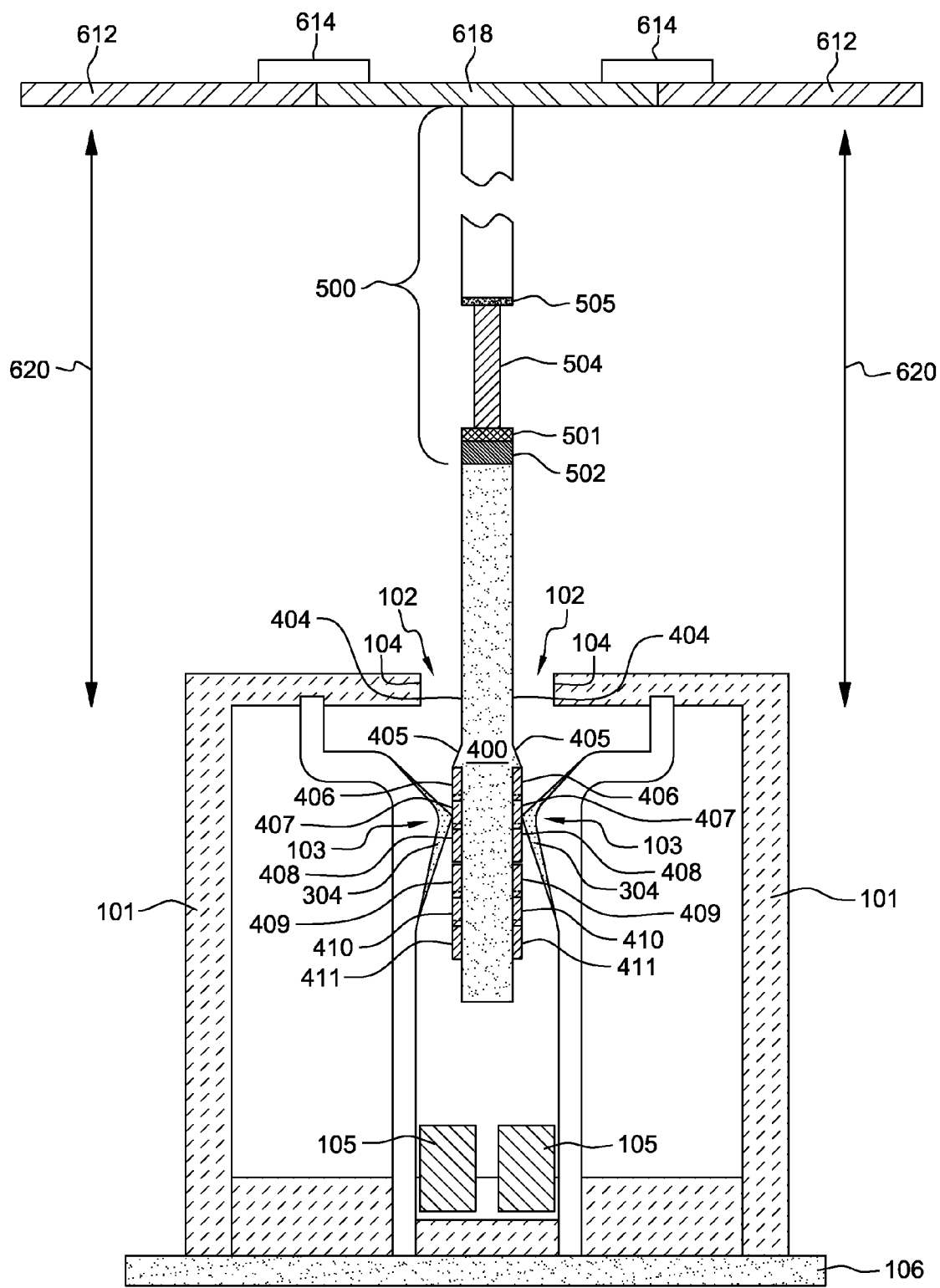
FIG. 6 is a cross-sectional view of card connector having a housing that includes a receiving slot wherein the card connector is connected to a motherboard, connector pins are adjacent to sidewalls of the receiving slot, an expansion card is inserted in the receiving slot, and the expansion card is coupled to a servomechanical device according to one embodiment of the present invention.

FIG. 6 illustrates a cross-sectional view of a card connector 100 having a housing 101 connected to motherboard 106, wherein electrical power is supplied to the card connector through the motherboard. Card connector 100 includes a receiving slot 102 with connector pins 103 that are adjacent to sidewalls 105. In addition, connector pins 103 are each coated with interface material 304 that includes, but is not limited to, gold and nickel. An expansion card 400 is inserted in receiving slot 102 parallel to sidewalls 104. Expansion card 400 is coupled to servomechanical device 500 utilizing plate latches 502. Servomechanical device 500 is coupled to card hardware 618. Card hardware 618 is secured to computer chassis 612 by system enclosure latches 614. Furthermore, electrical power is supplied to servomechanical device 500 through metal wiring that runs along computer chassis 612, wherein the metal wiring connects the servomechanical device to motherboard 106.

Servomechanical device 500 can slide expansion card 400 in a dimension 620 parallel to sidewalls 104 such that connector pins 103 can connect to contact pads 406 or backup contact pads 407-411 on the expansion card. Servomechanical device 500 can slide expansion card 400 based on a set of triggering events stored in computer memory to provide an improved electrical connection between connector pins 103 and contact pads 406 or backup contact pads 407-411. Specifically, an electrical signal can be sent from any capable onboard computer component (e.g., microcontroller or logic chip) through the metal wiring based on the set of triggering events, wherein the electrical signal instructs servomechanical device 500 to slide expansion card 400 a specified distance so that connector pins 103 connect to contact pads 406 or backup contact pads 407-411 for an improved electrical connection. The set of triggering events can include, but is not limited to, computer power-up, evaluation of card performance, and/or expiration of time representing the average useful life of interface material 304. For example, if interface material 304 has a useful life of six months, then every six months an electrical signal can be sent from the aforementioned onboard computer component instructing servomechanical device 500 to slide expansion card 400, so that connector pins 103 are connected to a subsequent set of backup contact pads 407-411. Sliding expansion card 400, so that connector pins 103 connect to a subsequent set of backup contact pads 407-411 can provide an improved electrical connection.

Figure 7:
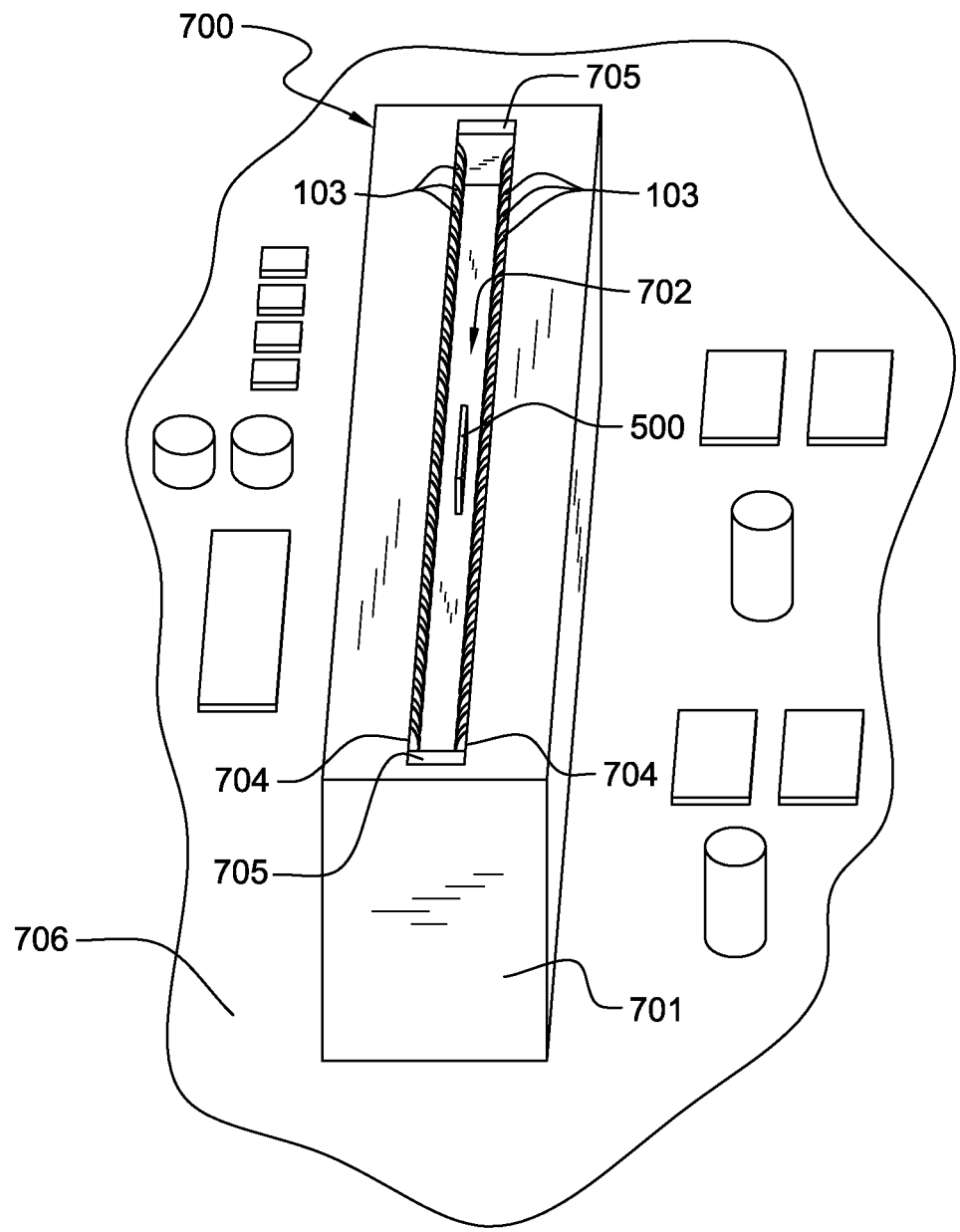
FIG. 7 is a perspective view of an alternative embodiment of a card connector having a servomechanical device and a housing that includes sidewall latches and a receiving slot, wherein connector pins are adjacent to sidewalls of the receiving slot, and wherein the card connector is coupled to a motherboard according to one embodiment of the present invention.

FIG. 7 illustrates a perspective view of an alternative embodiment of a card connector 700 having a housing 701, wherein the housing is connected to motherboard 706. Motherboard 706 supplies electrical power to card connector 700. Card connector 700 includes a receiving slot 702 with sidewalls 704, and connector pins 103 that are electrically isolated from each other to prevent unintended short circuiting. In addition, housing 701 includes sidewall latches 705 (also shown in FIG. 8) for securing expansion card 400 (shown in FIG. 4) that can be inserted in receiving slot 702. Furthermore, servomechanical device 500 (shown in FIG. 5) is coupled to card connector 700, and is in the card connector. Servomechanical device 500 can be utilized to slide expansion card 400, inserted in receiving slot 702, in a dimension 802 (shown in FIG. 8) parallel to sidewalls 704. Specifically, servomechanical device 500 can slide expansion card 400 based on a set of triggering events to provide an improved electrical connection between connector pins 103 and contact pads 406 or 407-411. An electrical signal can be sent from any capable onboard computer component (e.g., microcontroller or logic chip), through motherboard 706, to servomechanical device 500 based on the set of triggering events. The electrical signal instructs servomechanical device 500 to slide expansion card 400 a specific distance so that connector pins 103 connect to contact pads 406 or 407-411 for an improved electrical connection.

The distance servomechanical device 500 is required to move expansion card 400 is dependent upon the distance between contact pads 407-411, which can be determined after the expansion card is manufactured. The set of triggering events can include, but is not limited to, computer power-up, evaluation of card performance, and/or expiration of time representing the average useful life of interface material 304 (shown in FIG. 3). For example, if interface material 304 has a useful life of six months, then every six months an electrical signal can be sent from any capable onboard computer component (e.g., microcontroller or logic chip) instructing servomechanical device 500 to slide expansion card 400, so that connector pins 103 are connected to a subsequent set of backup contact pads 407-411. In the present embodiment, only one servomechanical device 500 is coupled to card connector 700, but in other embodiments more than one servomechanical device may be coupled to the card connector.

Figure 8:
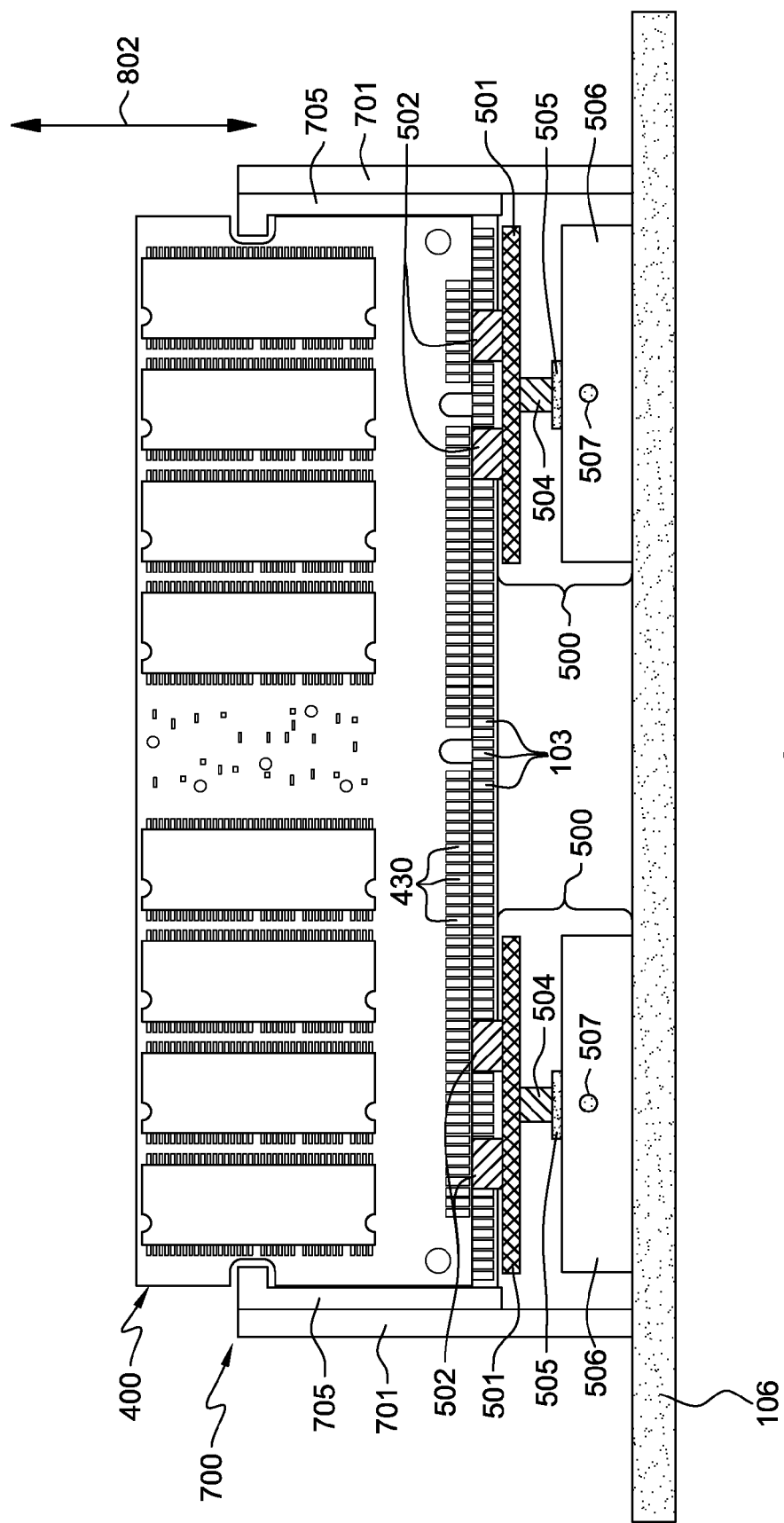
FIG. 8 is cross-sectional view of an alternative embodiment of a card connector having one or more servomechanical devices and a housing that includes sidewall latches and a receiving slot, wherein connector pins are adjacent to sidewalls of the receiving slot, an expansion card is inserted in the receiving slot, and wherein the expansion card is coupled to the one or more servomechanical devices according to one embodiment of the present invention.

FIG. 8 illustrates a cross-sectional view of an alternative embodiment of card connector 700 having an expansion card 400 inserted in receiving slot 702 (shown in FIG. 7), wherein two servomechanical devices 500 are coupled to the card connector to provide improved support/stability for the expansion card. Plate latches 502 and sidewall latches 705 ensure that expansion card 400 is secured in receiving slot 702. Moreover, sidewall latches 705 can move in a dimension 802, which enables servomechanical devices 500 to slide expansion card 400 as instructed by an electrical signal sent from any capable onboard computer component (e.g., microcontroller or logic chip), based on a set of triggering events. Specifically, servomechanical devices 500 can slide expansion card 400 in a dimension 802 parallel to sidewalls 704 (shown in FIG. 7) in order to connect connector pins 103 to contact pads 406 or backup contact pads 407-411 for an improved electrical connection.

Furthermore, those skilled in the art will note from the above description, that presented herein is a novel apparatus for mitigating wear of interface material on connector pins and contact pads to provide an improved electrical connection between the connector pins and contact pads on an expansion card.

Lastly, the foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An apparatus comprising:
    a card connector having a housing with a receiving slot;
    a connector pin disposed in the receiving slot;
    an expansion card having a first contact area and a second contact area, wherein the expansion card is coupled to the card connector; and
    a servomechanical device that is coupled to the expansion card, wherein the servomechanical device is configured to move the expansion card in the receiving slot such that a connector pin connection is changed from the first contact area to the second contact area;
    wherein:
    the servomechanical device comprises a support plate, a plate latch, a screw mechanism, an internally threaded cylindrical housing, a body, and a ratcheting-arm;
    the plate latch is utilized to secure the expansion card to the support plate; and
    the screw mechanism, the internally threaded cylindrical housing, and the ratcheting-arm are utilized to raise or lower the support plate.

2. The apparatus of claim 1, wherein the card connector and the servomechanical device are connected to a motherboard, the motherboard is connected to a power supply, and the motherboard provides electrical power from the power supply to the card connector and the servomechanical device.

3. The apparatus of claim 1, wherein:
    the housing comprises sidewall latches that secure the expansion card in the receiving slot; and
    the sidewall latches move in a dimension parallel to the receiving slot to allow the servomechanical device to slide the expansion card in the dimension parallel to the receiving slot.

4. The apparatus of claim 1, wherein:
    the servomechanical device is coupled to card hardware;
    the card hardware includes metal wiring that connects the servomechanical device to a motherboard;
    the motherboard is connected to a power supply that provides electrical power to the motherboard;
    the card hardware, through the metal wiring, provides electrical power from the motherboard to the servomechanical device; and
    the card hardware is secured to a computer chassis by system enclosure latches.

5. The apparatus of claim 1, wherein the servomechanical device is in the card connector.

6. The apparatus of claim 1, wherein the first contact area is a docking well region and the second contact area is a contact pad.

7. The apparatus of claim 1, wherein:
    the first contact area is a contact pad and the second contact area is a backup contact pad;
    the contact pad and the backup contact pad are copper with an interface material formed on the copper; and
    the interface material includes gold and nickel.

8. The apparatus of claim 1, wherein:
    the first contact area is a docking well region that includes a layer of nickel, and a trailing edge that is sloped to facilitate sliding of the expansion card;
    the second contact area is a contact pad that is copper with an interface material formed on the copper; and
    the interface material includes gold and nickel.

9. The apparatus of claim 1, wherein the servomechanical device slides the expansion card in the receiving slot, parallel to sidewalls of the receiving slot, based on a set of triggering events stored in computer memory on an electronic storage device.

10. The apparatus of claim 9, wherein the set of triggering events includes computer power-up, evaluation of card performance, and expiration of time that represents the average useful life of the interface material.

11. The apparatus of claim 1, wherein the servomechanical device is utilized to slide the expansion card from a first position where the connector pin is in contact with a docking well region, to a second position where the connector pin makes an electrical connection to a contact pad.

12. The apparatus of claim 1, wherein the servomechanical device is utilized to slide the expansion card from a first position where the connector pin is electrically connected to a contact pad, to a second position where the connector pin is electrically connected to a backup contact pad.

13. The apparatus of claim 1, wherein:
    the connector pin is copper and has contact regions that are coated with an interface material; and
    the interface material includes gold and nickel.

* * * * *